United States Patent
Dement et al.

(10) Patent No.: US 8,654,948 B2
(45) Date of Patent: Feb. 18, 2014

(54) SYSTEMS AND METHODS OF DETECTING COMMUNICATIONS FRAUD

(75) Inventors: Doug Dement, Atlanta, GA (US); Todd Kechter, Marietta, GA (US); Michael Anthony Clark, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 13/335,881

(22) Filed: Dec. 22, 2011

(65) Prior Publication Data

US 2013/0163737 A1 Jun. 27, 2013

(51) Int. Cl.
| | |
|---|---|
| H04M 3/42 | (2006.01) |
| H04M 15/00 | (2006.01) |
| H04M 17/00 | (2006.01) |
| H04M 1/66 | (2006.01) |
| H04M 1/68 | (2006.01) |
| H04M 3/16 | (2006.01) |

(52) U.S. Cl.
USPC ............ 379/201.01; 379/114.14; 379/127.02; 379/144.03; 379/145; 379/207.15; 455/410; 455/414.1

(58) Field of Classification Search
USPC ................. 379/91.01, 93.02, 114.14, 127.01, 379/144.03, 145, 189, 127.02; 455/410, 455/411
See application file for complete search history.

(56) References Cited

U.S. PATENT DOCUMENTS

| 5,970,404 | A | * | 10/1999 | Foti .............................. 455/410 |
| 6,122,624 | A | * | 9/2000 | Tetro et al. ..................... 705/44 |
| 8,238,532 | B1 | * | 8/2012 | Cox et al. ................. 379/114.14 |
| 2004/0034604 | A1 | * | 2/2004 | Klebanoff ........................ 705/65 |
| 2006/0285665 | A1 | * | 12/2006 | Wasserblat et al. ....... 379/114.14 |
| 2007/0099620 | A1 | * | 5/2007 | Patterson et al. ............. 455/445 |
| 2007/0121886 | A1 | * | 5/2007 | Marchand et al. ............ 379/219 |
| 2007/0186284 | A1 | * | 8/2007 | McConnell ..................... 726/25 |
| 2010/0080372 | A1 | * | 4/2010 | Mahone et al. .......... 379/114.14 |
| 2011/0238564 | A1 | * | 9/2011 | Lim et al. ......................... 705/38 |
| 2012/0072453 | A1 | * | 3/2012 | Guerra et al. ................. 707/776 |
| 2012/0130853 | A1 | * | 5/2012 | Petri et al. .................. 705/26.35 |
| 2012/0173570 | A1 | * | 7/2012 | Golden ........................ 707/769 |

FOREIGN PATENT DOCUMENTS

WO   WO 2011045604 A2 *   4/2011

* cited by examiner

*Primary Examiner* — Khai N Nguyen
(74) *Attorney, Agent, or Firm* — Benjamin A. Balser; Balser & Grell IP Law

(57) ABSTRACT

A telephone fraud prevention system is provided. A fraud application server is in communication with a fraud database and a switch that determines which calls are sent to the fraud application server. A policy function may be integrated with existing fraud detection and correlation systems. When a call is originated and authentication fails, whether that's through a PIN, voice recognition, etc., the fraud application server sends a message indicating that this customer has failed to authenticate. After a number of authentication failures, evidence of high-risk calling is determined. Instead of reactively dealing with the fraud, the risk has been captured at the fraud application server and the switch blocks potential damage from that call and from that user.

14 Claims, 6 Drawing Sheets

SYSTEMS AND METHODS OF DETECTING COMMUNICATIONS FRAUD

TECHNICAL FIELD

The present disclosure is generally related to communications and, more particularly, is related to communications fraud.

BACKGROUND

Communication fraud is the theft of communication services (telephones, cell phones, computers etc.) or the use of communication services to commit other forms of fraud. Victims include consumers, businesses and communication service providers. There are several types of communications fraud including identity theft, internet fraud, telemarketing fraud, auction and retail schemes, and money offer scams, among others.

In identity theft, information specific to an individual is misused in order to convince others that the imposter is the individual, effectively passing one self off as someone else. In internet fraud, a scheme is implemented that uses one or more components of the internet—such as chat rooms, email, message boards, or web sites to present fraudulent solicitations to prospective victims, to conduct fraudulent transactions, or to transmit the proceeds of fraud to financial institutions or to others connected with the scheme.

Telemarketing fraud is any scheme used to defraud in which the persons carrying out the scheme use the telephone as their primary means of communicating with prospective victims by trying to persuade them to send money to the scheme. Auction and retail schemes typically attract consumers by purporting to offer high-valve merchandise ranging from expensive jewelry to computers to sport memorabilia at attractive prices. After persuading victims to send money in the form of a personal check, money order, or cashier's check, schemers either send an inferior item or nothing at all.

In money offer scams, potential victims receive, either through e-mail or fax, a request from a purported high ranking government official (with the title of Doctor, Chief, or General) seeking permission to transfer a large sum of money out of their country into the victim's bank account. ATM fraud schemes use a special information storage device to secretly copy the magnetic strip on the back of credit and debit cards during a normal transaction such as an ATM withdrawal or in-store purchase (this may be called skimming).

The advancement of technological tools such as computers, the internet, and cellular phones has made life easier and more convenient for most people in our society. However some individuals and groups have subverted these communication devices into tools to defraud numerous unsuspecting victims. It is not uncommon for a scam to originate in a city, country, state, or even a country different from that in which the victim resides. There are heretofore unaddressed needs with previous communication fraud prevention solutions.

SUMMARY

Example embodiments of the present disclosure provide systems of communications fraud detection. Briefly described, in architecture, one example embodiment of the system, among others, can be implemented as follows: a fraud application server (FAS) configured to test calls for compliance with a fraud policy; a database comprising known and assumed fraudulent numbers; a routing engine configured to determine whether a call is to or from a fraudulent number and is to be passed to the FAS; and a router configured to route the call based on the test by the FAS.

Embodiments of the present disclosure can also be viewed as providing methods for communications fraud detection. In this regard, one embodiment of such a method, among others, can be broadly summarized by the following steps: saving known and assumed fraudulent numbers in a database; determining whether a call is to or from a fraudulent number; passing the call to or from a fraudulent number to a fraud application server; testing the call for compliance with a fraud policy; and routing the call based on the testing.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
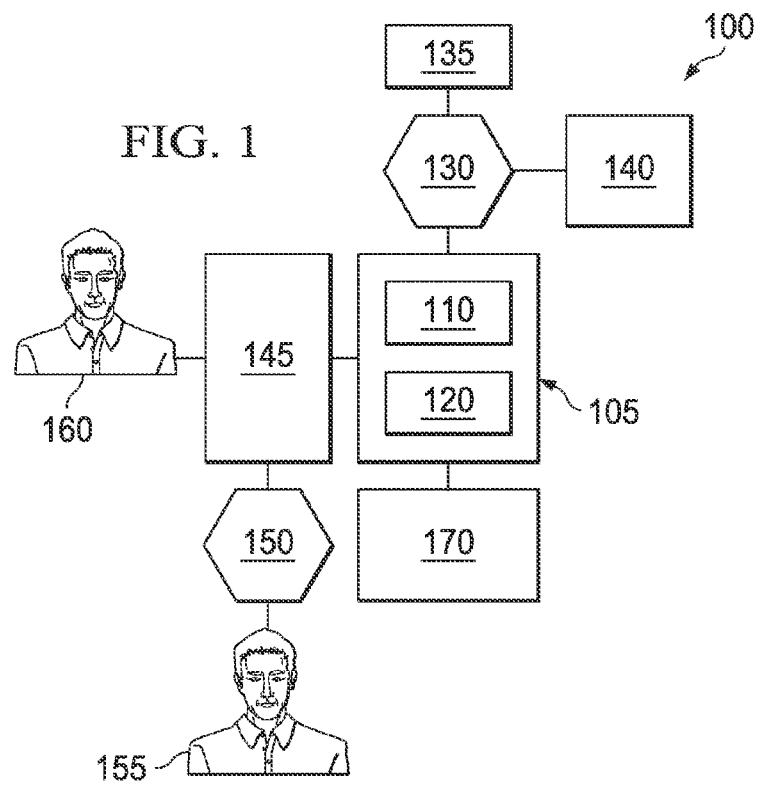
FIG. 1 is a system block diagram of a typical fraud detection system.

FIG. 1 provides system block diagram 100 of a current fraud detection system. A legitimate call is initiated from telephony subscriber 160 via customer maintained telephony equipment (CMTE) 145. A call could imply signaling and media flow(s) associated with one or more sessions established between communication endpoints identified by a number, other type of address, or identifier. CMTE 145 sends the legitimate call to telephony softswitch 110 to PSTN 130 and on to legitimate telephony network or endpoint 140. A call detail record (CDR) is sent from telephony softswitch 110 to fraud detection and correlation system 120 where the data from the call is correlated. Illegitimate user 155 hacks into CMTE 145, for example, through network 150, and gains access to customer data and communication systems/services. Illegitimate user 155 then initiates a first fraudulent call to CMTE 145 which is sent through switch 110 and PSTN 130 to fraudulent telephony network or endpoint 135. Any number of these fraudulent calls may be placed. The call may also be placed to an otherwise legitimate endpoint. At some point, a CDR for a fraudulent call is sent from switch 110 to fraud detection correlation system 120. The correlation indicated the fraud and fraud team 170.

Current fraud detection services are examples of reactive systems such as a system to detect credit card fraud, for instance. A communications provider may send "call data records" from various switches such as telephony switches and collect them, for example, once an hour. That system correlates the information and then notices that there is a problem. For example, a problem may be that this person is making a large number of international calls. However, the detection may take another twenty or thirty minutes to get the case escalated to an appropriate handler, who might place blocks on those accounts. In this example, the delay may be hours or days until a compromised CMTE, for example a customer's PBX is sufficiently secured or blocked, which may result in a significant expense from illegitimate international and long distance calls. The upstream telephony providers bill for any calls they terminate whether the call was fraudulent or not resulting in a large amount of lost revenue by the communications provider of legitimate customer 160 due to the fraudulent calls.

Example embodiments of the disclosed systems and methods of detecting communications fraud may be instrumental in removing or reducing costs due to fraud. In an example embodiment, user authentication such as a personal identification number (PIN) may be implemented. A database is used to collect information from fraud organizations. Currently some service providers may choose to manually map information from industry databases to switch translations on a periodic basis (for example, once per month. Any new fraud related information during that period will not be included, leading to large delays in recognizing fraud and high fraud-based costs. For this reason, some service entities have blocked some countries entirely. For example, a customer may not be able to call some countries without operator-assistance.

Figure 2:
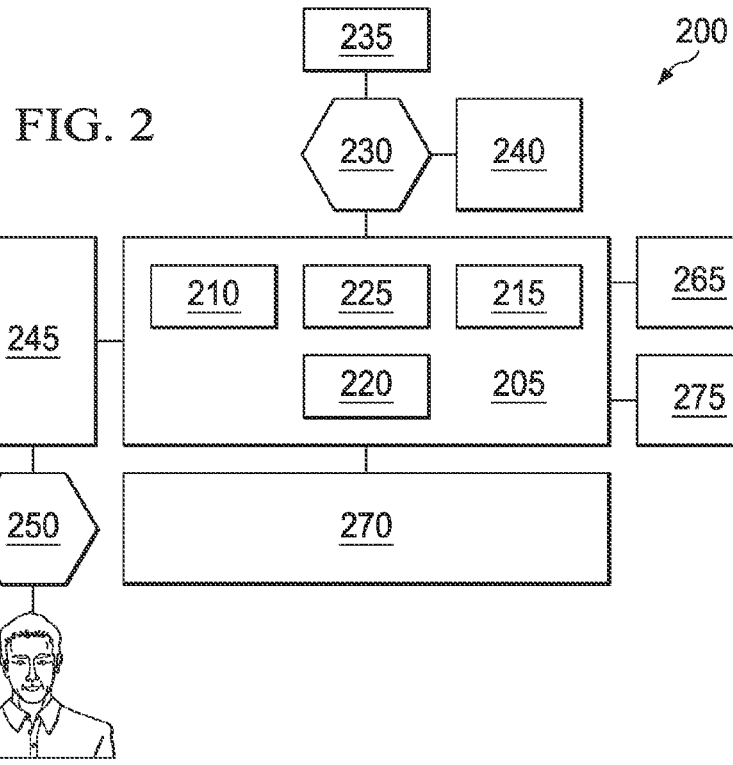
FIG. 2 is a system block diagram of an example embodiment of a system of communications fraud detection.

FIG. 2 provides system block diagram 200 of an example embodiment of a system of communication fraud detection. Known fraud destination data is loaded from communications industry fraud organizations such as Communication Fraud Control Association (CFCA) fraud database 265 and Global System for Mobile communications (GSM) fraud database 275, as non-limiting examples, into fraud prevention system 215. A legitimate call is received from telephony subscriber 260 into customer maintained telephony equipment (CMTE) 245. CMTE 245 sends the legitimate call to telephony softswitch 210 and to session initiation protocol (SIP) core 225. If the call is domestic, the call is processed normally, passed to PSTN 230 and on to legitimate telephony network or endpoint 240. If the call is international, SIP core 225 attempts to match the destination number to numbers in fraud prevention system 215. If the call has no recent fraudulent attempts, the call destination is not a high risk country, and authentications have been successful, the call is processed normally, passed to PSTN 230 and on to legitimate telephony network or endpoint 240. A CDR is sent from softswitch 210 and/or SIP core 225 to fraud detection and correlation system 220 where the data from the call is correlated. If, the international call destination is a high risk country, caller 260 is asked to further authenticate himself, for example, by providing a pre-assigned PIN. If the authentication is successful, the call is forwarded by SIP core 225 through PSTN 230 to endpoint 240.

If fraudulent caller 255 hacks into CMTE 245 through, for example, network 250, and a fraudulent call reaches SIP core 225, it can be determined to be potentially fraudulent, for example, by matching a known fraudulent number in fraud prevention system 215 or by being to an at-risk country, among other factors. The caller may then be asked for further authentication information. Should incorrect information be input, the call may be blocked, for example, by sending it to a null destination. Alternatively, the call may be treated (for example by an IVR) and terminated by the SIP core. An event notice may be sent from fraud prevention system 215 to fraud detection and correlation system 220. Fraud team 270 may contact legitimate user 260 so she can address the fraudulent use of the CMTE. After fraudulent destinations have been confirmed, they may be added to fraud prevention system 215. Although this system was described for detecting and remediating fraud in international communications, it is also applicable for detecting and remediating fraud in domestic long distance and toll communications.

A policy server may be used to implement a fraud mitigation policy. An example policy may escalate an account of originating number that has been determined to have dialed known bad numbers. The account may be escalated to a probationary status. The policy may also include a function for requesting additional authentication information for originating numbers in a probationary status. The additional authentication may include, as a non-limiting example, a pre-defined personal identification number (PIN) that has been assigned or that the user has chosen at the time she signed up. Alternatively, the account may be temporarily shut down through automated means until customer service is contacted.

In yet another example embodiment, a voice-print or other biometric data may be used. When a user initiates a call, the interactive voice response (IVR) system asks for the authentication information. The user may navigate through a menu system. In an example implementation, a SIP-based protocol is used to check the call against the fraud policy. If the call does not meet an element of the fraud policy, then no further authentication is requested and the call is forwarded for normal call processing. If the call does meet an element of the fraud policy, an Identity Management System may be accessed, in which the user's PIN or some other form of authentication information is saved. Alternatively, the call is forwarded to the IVR system, which may require a media server and a controlling application server, as non-limiting examples. In an example implementation, the IVR functions may be housed in an edge/border device—whether it is a customer edge device, a media/trunking gateway, or a peering session border controller.

Figure 3:
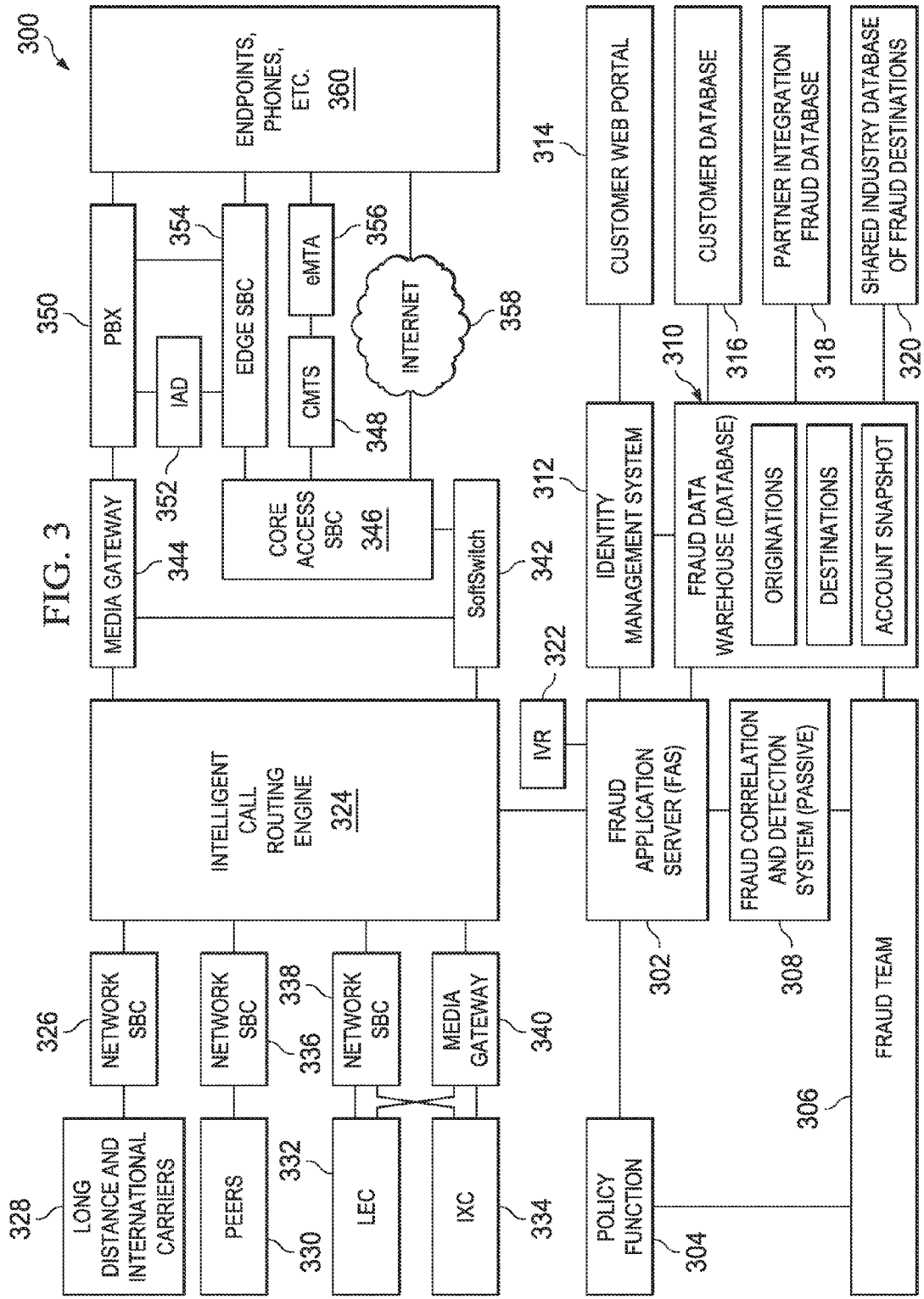
FIG. 3 is a system block diagram of an example embodiment of the system of FIG. 2.

FIG. 3 provides a block diagram of an example embodiment of the disclosed telephone fraud prevention system. In an example embodiment, fraud application server 302 is in communication with fraud database 310 and call routing engine 324 that determines which calls are sent to fraud application server 302. Policy function 304 may be integrated with existing fraud correlation and detection system 308. When a call is originated and authentication fails, whether through a PIN, voice recognition, etc., fraud application server 302 sends a message to fraud correlation and detection system 308 indicating that this customer has failed to authenticate. After a number of authentication failures, evidence of high-risk calling is determined. Instead of reactively dealing with the fraud, the risk has been captured at fraud application server 302 and the system blocks potential damaging calls from that user.

Known fraudulent destination telephone numbers may be collected from multiple sources (such as customer database 316, partner integration fraud database 318, and shared industry database 320), normalized, and stored in the fraud data warehouse (database) 310. New fraudulent destination numbers may be added in real-time by the fraud team without the need for new switch translations each time new fraudulent destinations have been identified. Access to fraud data warehouse 310 may be provided to third parties via application programming interface (API) exposure.

Telephony subscribers will place toll calls using customer controlled end-points 360. These calls traverse the serving telephony switches and are routed to intelligent routing engine 324 for all long distance or international call completion. All toll calls are routed through intelligent call routing engine 324, which acts as a single choke point in the network. In an example embodiment, security decisions can be made in intelligent call routing engine 324 prior to passing the call to a terminating carrier. Intelligent call routing engine 324 determines that calls destined for particular profiles will be transferred to fraud application server 302 for special treatment. Such calls may be domestic long distance, international long distance, international to specific countries, etc.

In an example embodiment, fraud application server 302 enforces policy function 304 by testing the call for compliance to policy function 304 prior to passing the call back to intelligent call routing engine 324 for call completion. Fraud application server 302 is responsible for looking at outbound calls, analyzing call history and patterns, and enforcing policy function 304 in real-time. Using the SIP protocol, for example, fraud application server 302 orchestrates the handling of each call that is sent to it for processing. When appropriate, fraud application server 302 sends calls to IVR 322 for media presentation, authentication, or other data collection. Useful data about each call and the associated source and destination phone numbers and accounts are stored in fraud data warehouse 310. In an example embodiment, fraud application server 302 updates fraud data warehouse 310 with call information when appropriate and relies upon it for fast storage and retrieval of prior call and user information.

Fraud data warehouse 310 and fraud application server 302 may work together to maintain a trust status for each source phone number and/or subscriber account. The trust level may be determined by the number and type of policy violations over time as outlined by policy function 304. Trust levels are variable and may be defined within policy function 304. In an example implantation, three trust levels may be defined (Trusted, Probation, Suspended). All accounts may be assumed to be 'Trusted' unless their trust level has been escalated to either 'Probation' or 'Suspended.' Intelligent call routing engine 324 will preferably complete connections for calls that either do not require treatment or have already received treatment and are approved for call completion.

As data comes into fraud application server 302, fraud application server 302 queries fraud data warehouse 310 for information about the recent call history for the source phone number and/or account. Fraud application server 302 then uses this data to assess the current call for policy violations. If no violations are found, the fraud application server 302 documents the trusted relationship and records pertinent information about the call in fraud data warehouse 310 before passing the call back to the intelligent call routing engine 324 for completion (marked as approved). If violations to policy function 304 are discovered, call treatment may be determined by the workflow for that trust level. Violations may cause the trust level to escalate to probation or suspended in accordance with settings in policy function 304. This may invoke additional authentication or other actions such as collecting information or playing pre-recorded messages to the subscriber. Fraud application server 302 records the treatment and the associated violations within fraud data warehouse 310 for future reference. This data may be assigned a time to live or a duration according to policy function 304 before it is marked for archive and ignored during subsequent policy evaluations. Such data is no longer usable for treatment and policy enforcement decisions but may be retained for historical reference or deleted as defined by policy function 304.

Customer controlled end-points 360, either hardware or software based, may interface with a wide array of technologies in order to access features or routing services of a communications system. An end-point may utilize the Internet 358, wireless networks, or WiFi networks to exchange signaling and/or media with communication systems. Embedded Multimedia Terminal Adapter (eMTA) 356 and Cable Modem Termination Systems (CMTS) 348 allow an endpoint on a cable provider's network to exchange signaling and/or media with communication systems. Likewise, Edge or Enterprise Session Border Controller (SBC) 354 or private branch exchange (PBX) 350 may also provide end-points with access to communication systems. Edge SBC 354 may provide Internet Protocol (IP) connectivity to Integrated Access Devices (IAD), which may provide time division multiplexing (TDM) interfaces to PBX 350 systems, or provide IP connectivity to directly to PBX 350. Core Access SBC 346 may be utilized as a security device between core network components and equipment facing customers. Media Gateway/Trunking Gateway 344, 340 may be used to convert IP signaling and media into TDM interfaces to interact with PBX 350, local exchange carrier (LEC) 332, or Inter-Exchange Carrier (IXC) 334.

Alternately, Network SBC 338, may also be used as a security device between networks if LEC 332 and IXC 334 are capable of exchanging signaling and media via IP communications. The same applies to Network SBC 326, 336 for providing IP communications between Long Distance and International Carriers 328 and Peers 330. Softswitch 342 may provide communications features to end-points and may control gateways. Subscriber services such as configuration of authentication credentials may be offered through customer portal 314 that may leverage identity management system 312 for authentication and credential storage.

In an example embodiment, call treatment for the 'probation' trust level enacts workflows which present additional authentication challenges (controls) to the caller prior to allowing the call to proceed. These flows may cause fraud application server 302 to query outside resources such as identity management system 312 to gather subscriber specific information such as a unique personal identification number (PIN), biometric data (voice print, for example), questions only a legitimate customer could answer, or other authentication mechanisms. In such cases, the call may be redirected to external systems such as IVR 322 for information presentation and data input collection. Based on policy function 304 and workflow, additional information may be collected prior to call completion. For instance, the system may collect an alternate form of payment (credit or calling card) or a voice receipt of the customer saying a phrase such as "My name is [insert customer name here] and I understand and accept the charges for this phone call". Failure to meet the "probation" trust level in policy function 304 may generate notifications to fraud monitoring systems and prevent call completion. Once certain conditions of policy function 304 have been met, accounts may be escalated to the 'Suspended' trust level whereby all calls from a source number or account will be blocked until the trust level is manually raised by an authorized entity.

In an example embodiment, call treatment at the suspended trust level may provide very limited functionality and/or limited possibility for successful toll call processing. Fraud data warehouse 310 continues to record any call attempts. The workflow may play a message to the subscriber asking the caller to call customer service. Policy function 304 determines how long (if not indefinite) and under what conditions an account or source phone number will remain at a lower trust level before being automatically migrated to a higher level.

All policy violations may generate events that are collected through passive fraud monitoring system 308. Authorized agents of fraud team 306 may access, augment, or modify data within fraud data warehouse 310 and policy function 304 as necessary and in real time without having to add new switch translations.

Policy function 304 may comprise a number of policies to be enforced by fraud application server 302. As an example, if the account or source telephone number has failed to authenticate when requested, a fraud event or alert is generated. The trust level for that account or source telephone number may be decreased to 'probation'. Additionally, the trust level is only auto-escalated back to 'trust' if there are no policy violations within a specified time period (e.g. 24 hours).

As another policy example, the account or source telephone number has reached the maximum number of authentication failures within a pre-defined period of time. In this case, a fraud event or alert is generated and the trust level of the source is decreased to 'suspended.'

In another policy example, the account or source telephone number has attempted to call a 'blacklisted' destination. In that case a fraud event or alert may be generated and the trust level of the source decreased to 'probation.' Also, the trust level may only be auto-escalated (to trust) if there are no policy violations within a specified time period (e.g. 60 days).

In another policy example, the account or source telephone number has reached the maximum number of attempted calls to 'blacklisted' destinations within a pre-defined period of time. In that case a fraud event or alert may be generated and the trust level of the source decreased to 'suspended.' Also, auto-escalated of the trust level may be prohibited.

In yet another policy example, the account or source telephone number has attempted or completed more than the predefined number of allowed long distance or international calls within a pre-defined period of time for their account class. In this case a fraud event or alert may be generated and the trust level of the source decreased to 'probation.' Also, the trust level may only be auto-escalated (to trust) if there are no policy violations within a specified time period (e.g. 60 days).

In another policy example, the account or source telephone number has reached the maximum defined number of concurrent long distance or international call sessions for their account class. In this case a fraud event or alert may be generated and the trust level of the source decreased to 'probation.' Also, the trust level may only be auto-escalated (to trust) if there are no policy violations within a specified time period (e.g. 24 hours).

In another policy example, the account or source telephone number has reached the maximum defined number of billable minutes over a specified duration of time for their account class. In this case a fraud event or alert may be generated and the trust level of the source decreased to 'probation.' Also, the trust level may only be auto-escalated (to trust) if there are no policy violations within a specified time period (e.g. 24 hours).

In another policy example, the account or source telephone number has reached the maximum defined number of policy violations over a specified duration of time for their account class. In this case a fraud event or alert may be generated and the trust level of the source decreased to 'suspended.' Also, auto-escalation of the trust level may be prohibited.

Figure 4:
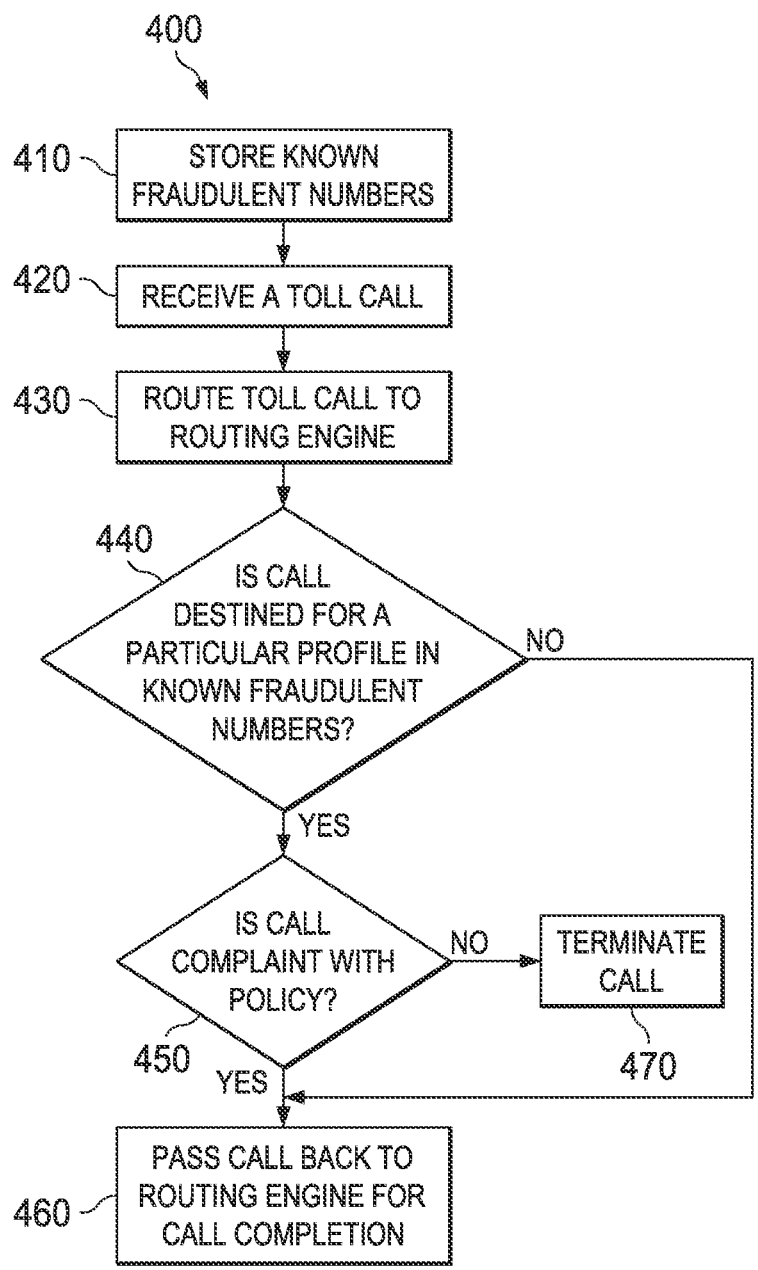
FIG. 4 is a flow diagram of an example embodiment of a method of communications fraud detection.

FIG. 4 provides a block diagram of an example embodiment of a method of detecting communications fraud. In block 410, known fraudulent numbers are stored in a database. In block 420, a toll call is received. In block 430, the toll call is routed to a routing engine. In block 440, the call is examined to determine of the call is destined for a particular profile in the database of known fraudulent numbers. If the call is not destined to a profile in the database, then, in block 460, the call is passed to the routing engine for call completion. If the call is destined to a profile in the database, then, in block 450, a determination is made as to whether the call is compliant with a fraud policy. If it is not compliant, then in block 470, the call is terminated. If the call is compliant, then, in block 460, the call is passed back to the routing engine for call completion.

Figure 5A:
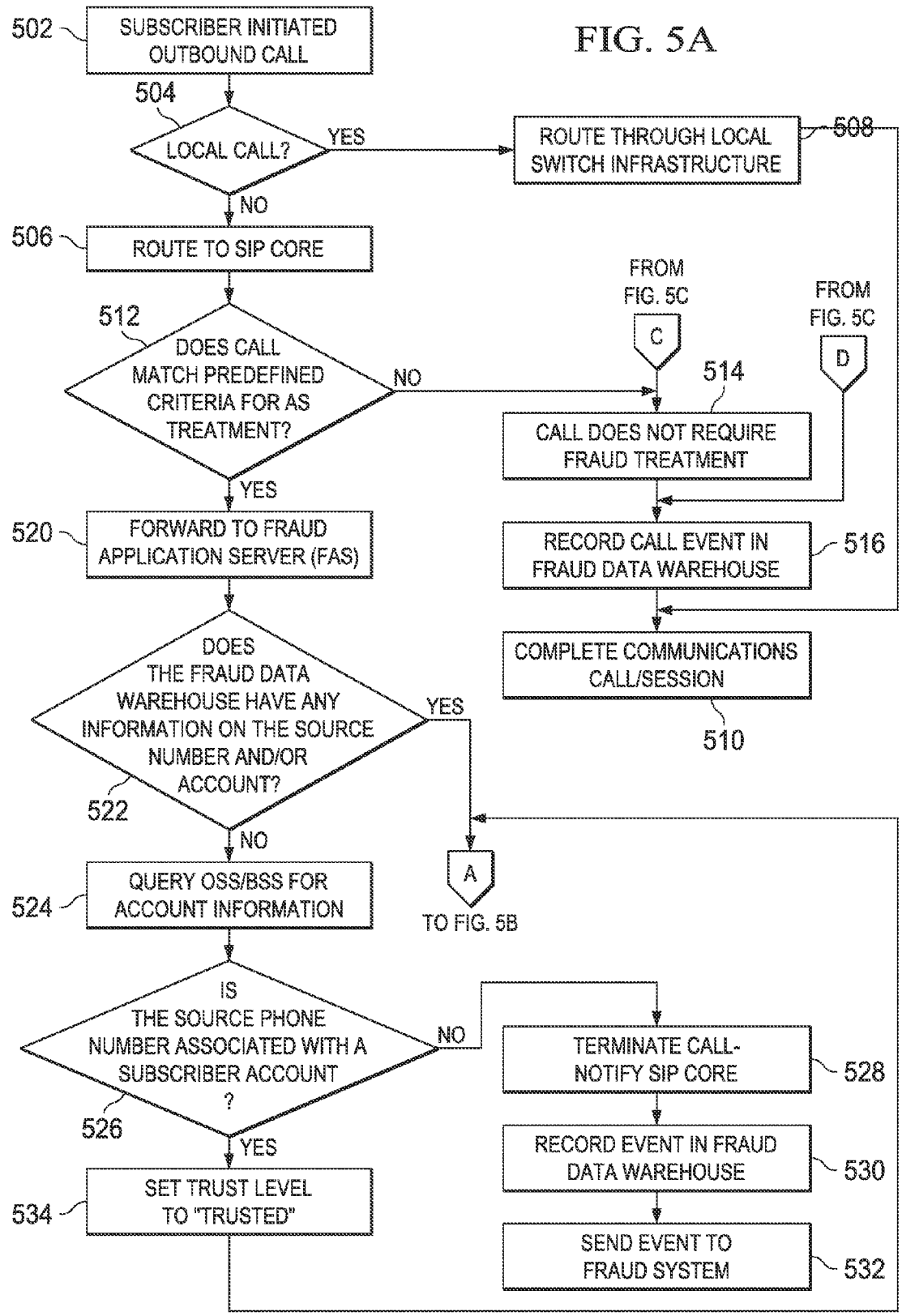
FIG. 5A is a flow diagram of an example embodiment of a method of communications fraud detection.
Figure 5B:
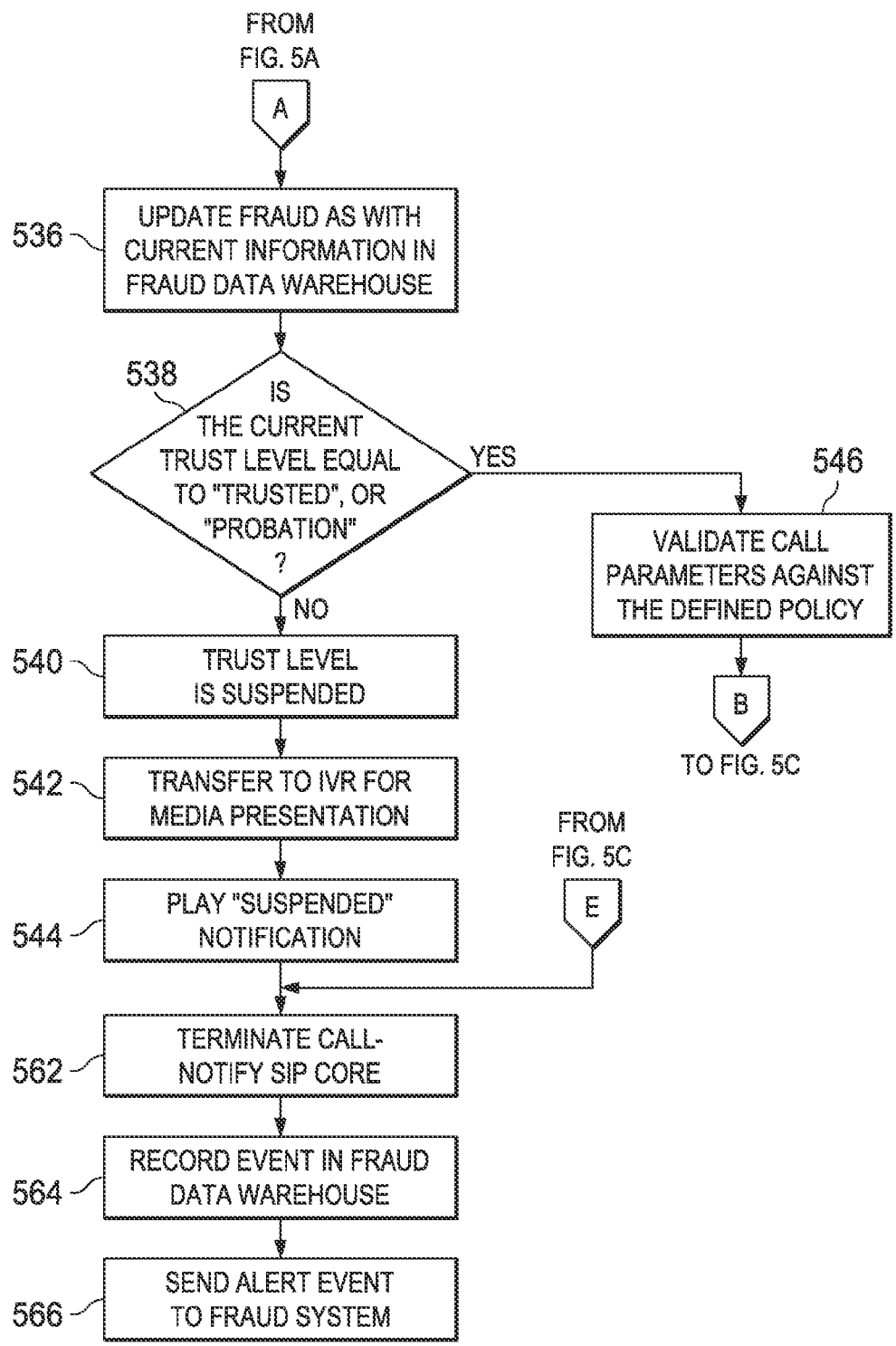
FIG. 5B is a flow diagram of an example embodiment of a method of communications fraud detection.
Figure 5C:
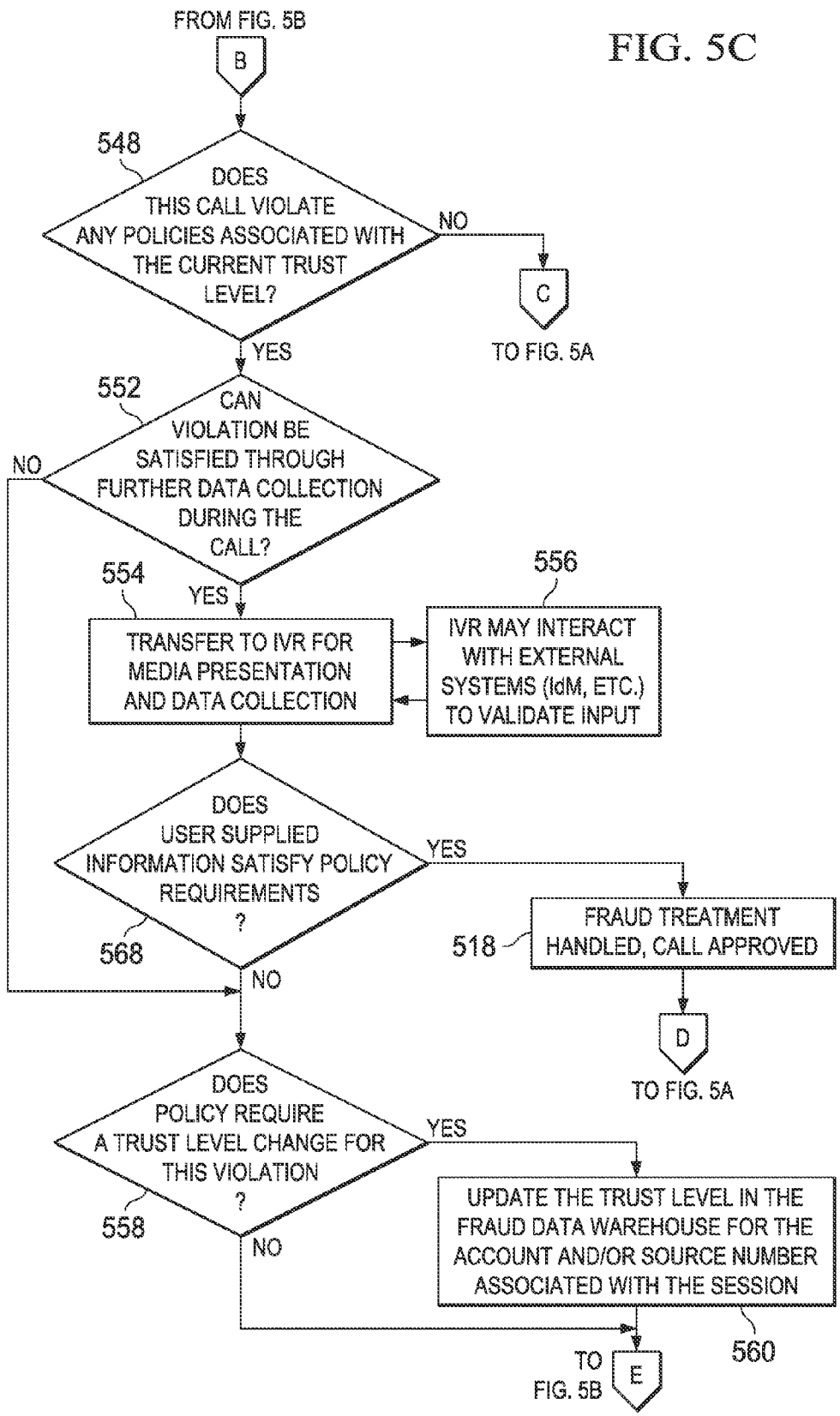
FIG. 5C is a flow diagram of an example embodiment of a method of communications fraud detection.

FIG. 5A, 5B, and 5C provide a flow diagram of an example embodiment of a method of communications fraud detection. In block 502, a subscriber initiates an outbound call. In block 504, a determination is made as to whether it is a local call. If the call is a local call, then in block 508, the call is routed through local switch infrastructure and the call is completed in block 510. If the call is not a local call, then in block 506 it is routed to the SIP core. In block 512 a determination is made as to whether the call matches predefined criteria for treatment. If it does not match the predefined criteria, in block 514, the call is determined not to require fraud processing. In block 516, a call event is recorded in a fraud data warehouse, and in block 510, the call is completed.

If, in block 512, the call does match predefined criteria, in block 520, the call is forwarded to a fraud application server (FAS). In block 522, a determination is made as to whether the fraud data warehouse has any information on the source number and/or account. If it does not have any information, in block 524 the Operations Support Systems/Billing Support Systems (OSS/BSS) are queried for account information. In block 526 a determination is made as to whether the source phone number/identifier is associated with a subscriber account to prevent possible forms of call spoofing, for example. If it is not, in block 528 the call is terminated and the SIP core is notified, in block 530, the event is recorded in the data warehouse, and in block 532, the event is sent to the fraud system. If the source phone number is associated with a subscriber account, then in block 534 the trust level is set to "trusted" and in block 536 the FAS is updated with current information from the data warehouse.

If, in block 522, the fraud data warehouse has information on the source number and/or the account, again, in block 536, the FAS is updated with current information from the fraud data warehouse. In block 538, a determination is made as to whether the current trust level is equal to "trusted" or "probation." If the current trust level is not "trusted" or "probation," then in block 540, the current trust level is "suspended" and in block 542, the call is transferred to an IVR for media presentation. In block 544, a "suspended" notification is played. In block 562, the call is terminated and the SIP core is notified. In block 564, the event is recorded in the data warehouse. In block 566, an alert event is sent to the fraud system.

If, in block 538, it is determined that the trust level is either "trusted" or "probation," then, in block 546, the call parameters are validated against the defined policy. In block 548, a determination is made as to whether the call violates any policies associated with the current trust level. If it does not violate any policy, then, in block 514, the call does not require fraud treatment and in block 516, the event is recorded in the fraud data warehouse, and the call/session is allowed to be processed by the SIP core in block 510 for further processing.

If, in block 548, the call violates a policy, a determination is made as to whether the violation can be satisfied through further data collection during the call. If the violation can be satisfied with further data collection, then in block 554, the call is transferred to the IVR for media presentation and data collection. In block 556, the IVR interacts with the caller and external systems to validate the caller's input. In block 568, a determination is made as to whether the user supplied information satisfies the policy requirements. If the information satisfies the policy requirements, in block 518, the fraud treatment is handled and the call is approved. In block 516, the call event is recorded in the fraud data warehouse and in block 510, the call is completed. If, in block 568, the information does not satisfy the policy requirements or, in block 552, if the violation cannot be satisfied though further data collection during the call, then in block 558, a determination is made as to whether the policy requires a trust level change for this violation. If it does, then in block 560, the trust level is updated in the data warehouse for the account and/or source number associated with the call. If the policy does not require a trust level change, then, in block 562, the call is terminated and the SIP core is notified, the event is recorded in the data warehouse in block 564, and an alert event is sent to the fraud system in block 566.

The flow charts of FIG. 4 and FIGS. 5A, B, and C show the architecture, functionality, and operation of a possible implementation of communications fraud detection software. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 4 or 5 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non exhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

Although the present disclosure has been described in detail, it should be understood that various changes, substitutions and alterations can be made thereto without departing from the spirit and scope of the disclosure as defined by the appended claims.

The invention claimed is:

1. A system comprising:
   a fraud application server (FAS) configured to test calls for compliance with a fraud policy;
   a database comprising known and assumed fraudulent numbers;
   a routing engine configured to determine a trust level of at least one of trusted, probation, and suspended with each of trusted, probation, and suspended applied to at least one number of the database, and to determine whether a call is to or from a fraudulent number and is to be passed to the FAS, wherein if the routing engine determines that the call is to or from the fraudulent number, the FAS queries for subscriber specific information; and
   a router configured to route the call based on the test by the FAS.

2. The system of claim 1, wherein the trust level is determined by the numbers and type of policy violations.

3. The system of claim 1, wherein the database is updated in real time for every call.

4. The system of claim 1, wherein the subscriber specific information comprising at least one of: unique personal identification number (PIN), biometric information, and answer to a preset personal question.

5. The system of claim 4, wherein, if the call is determined to be to or from a fraudulent number, an alternative form of payment is requested.

6. A method comprising:
   saving known and assumed fraudulent numbers in a database;
   determining a trust level for each source number in the database, the trust level comprising at least one of trusted, probation, and suspended with each of trusted, probation, and suspended applied to at least one number of the database;
   determining whether a call is to or from a fraudulent number; passing the call to or from the fraudulent number to a fraud application server; testing the call for compliance with a fraud policy, wherein if the call is determined to be to or from the fraudulent number, further comprising querying for subscriber specific information; and
   routing the call based on the testing.

7. The method of claim 6, wherein determining the trust level further comprises determining the trust level by the number and type of policy violations.

8. The method of claim 6, further comprising updating the database in real time for every call.

9. The method of claim 6, wherein the subscriber specific information comprising at least one of: unique personal identification number, biometric information, and answer to a preset personal question.

10. The method of claim 9, wherein further comprising requesting an alternative form of payment if the call is determined to be to or from a fraudulent number.

11. A non-transitory computer readable medium comprising instructions for performing a method, the method comprising:

saving known and assumed fraudulent numbers in a database;

determining a trust level for each source number in the database, the trust level comprising at least one of trusted, probation, and suspended with each of trusted, probation, and suspended applied to at least one number of the database;

determining whether a call is to or from a fraudulent number; passing the call to or from the fraudulent number to a fraud application server; testing the call for compliance with a fraud policy, wherein if the call is determined to be to or from the fraudulent number, further comprising instructions for querying for subscriber specific information; and routing the call based on the testing.

12. The computer readable medium of claim 11, wherein instructions for determining the trust level further comprises instructions for determining the trust level by the number and type of policy violations.

13. The computer readable medium of claim 11, further comprising instructions for updating the database in real time for every call.

14. The computer readable medium of claim 11, wherein the subscriber specific information comprising at least one of: unique personal identification number, biometric information, and answer to a preset personal question.

\* \* \* \* \*